(12) United States Patent
Shesol

(10) Patent No.: US 7,004,922 B1
(45) Date of Patent: Feb. 28, 2006

(54) ANIMAL WOUND WRAP FOR HOLDING A PRIMARY WOUND DRESSING ON AN ANIMAL WOUND

(76) Inventor: Barry F. Shesol, 18158 E. Long Ave., Aurora, CO (US) 80016

( * ) Notice: Subject to any disclaimer, the term of this patent is extended or adjusted under 35 U.S.C. 154(b) by 85 days.

(21) Appl. No.: 10/759,688

(22) Filed: Jan. 15, 2004

(51) Int. Cl.
*A61F 13/00* (2006.01)
*A01K 27/00* (2006.01)

(52) U.S. Cl. .............................. 602/79; 602/60; 119/856

(58) Field of Classification Search .................. 602/75, 602/63, 79, 19; 128/869, 877, 888, 889; 119/654, 815, 907
See application file for complete search history.

(56) References Cited

U.S. PATENT DOCUMENTS

| | | | | |
|---|---|---|---|---|
| 3,282,264 A | * | 11/1966 | Connelly | 602/19 |
| 5,632,235 A | * | 5/1997 | Larsen et al. | 119/856 |
| 5,843,018 A | * | 12/1998 | Shesol et al. | 602/79 |
| 5,897,519 A | * | 4/1999 | Shesol et al. | 602/79 |
| 5,941,199 A | * | 8/1999 | Tamura | 119/850 |

* cited by examiner

*Primary Examiner*—Kim M. Lewis
(74) *Attorney, Agent, or Firm*—Edwin H. Crabtree; Ramon L. Pizarro; Donald W. Margolis

(57) ABSTRACT

An animal wound wrap used for holding a primary wound dressing, an IV tube and/or drain tube in place on an animal's body. The animal wound wrap includes an elongated abdomen wrap portion and an elongated extension wrap portion. The two wrap portions are made of stretchable loop-like loose weave material along their length. The abdomen wrap portion can be stretched along a first axis while the extension wrap portion can be stretched along a second axis at an angle to the first axis. The abdomen wrap portion includes a first end portion with hook fasteners and a second end portion for releasably engaging the hook fasteners. The extension wrap portion includes a first end portion attached to a side of the abdomen wrap portion and at an angle thereto. The extension wrap also includes a "U" shaped second end portion. The "U" shaped second end portion includes a first strap and a second strap. The straps are adapted for receipt around the animal's neck, tail, leg or other parts of the animal's body. The hook fasteners are used for securing the straps thereon.

17 Claims, 1 Drawing Sheet

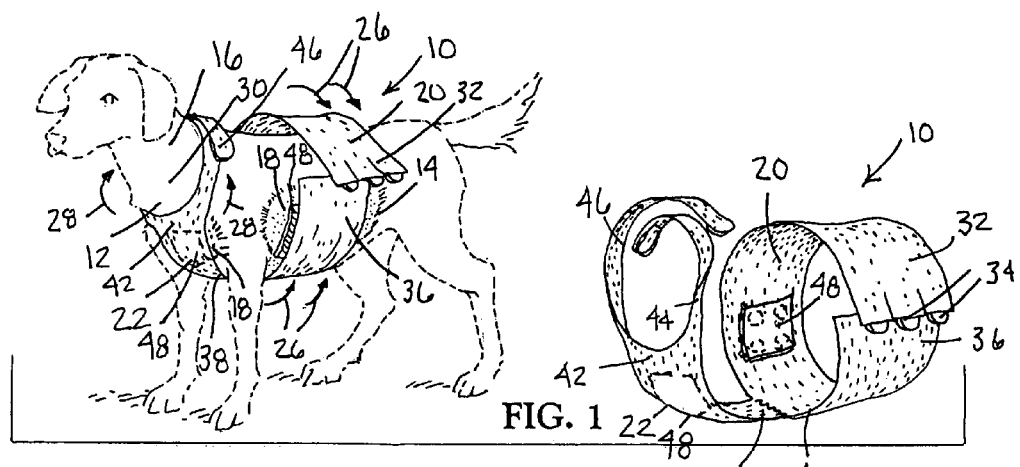
FIG. 1
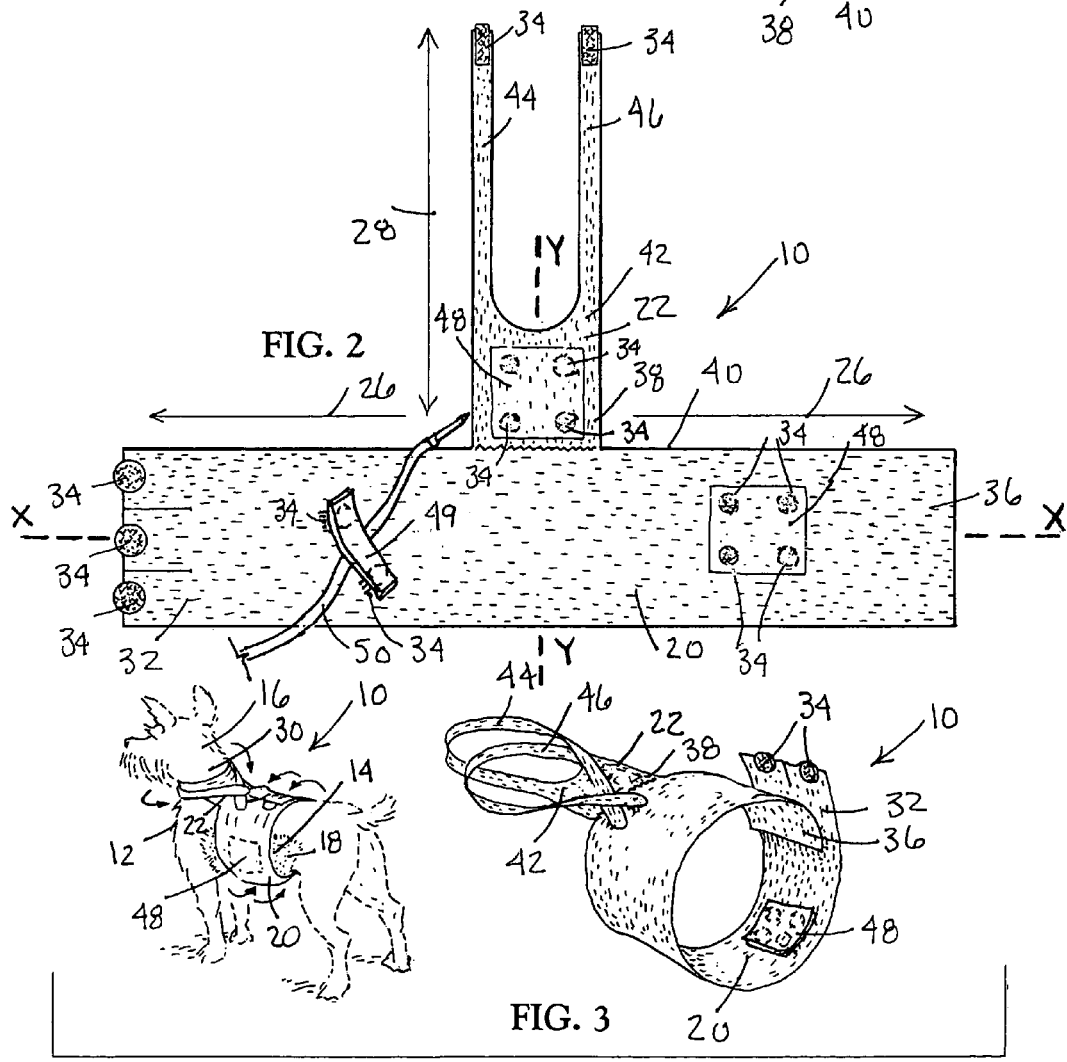
FIG. 2
FIG. 3

ANIMAL WOUND WRAP FOR HOLDING A PRIMARY WOUND DRESSING ON AN ANIMAL WOUND

BACKGROUND OF THE INVENTION (a) Field of the Invention

This invention relates to an animal wound wrap and more particularly, but not by way of limitation, to an animal wound wrap for holding a primary wound dressing, a tube and/or a drain in place at various locations on an animal's body.

(b) Discussion of Prior Art

Heretofore, animal and human medicine have at times been able to share some technologies and basic treatment principles. It is however obvious that this sharing is impractical when issues of differences in anatomy, the presence of coats of fur and special idiosyncratic behavior are considered.

These differences predispose animal wound care to complicated problems of retention of the wound dressings. Complicating an already difficult problem are the anatomic variations due to differences among breeds and the need for wound dressings to withstand animal behavior. There are few options available in veterinary medicine. If one needs to secure a wound dressing, a cold/hot pack, a surgical tube or drain, an intravenous device or any other treatment device, treatment or retention choices are often cumbersome, time consuming, precarious and complicated to the untrained. Traditional solutions for the caregiver are limited to adhesives and/or non-conforming wraps.

The present invention, by virtue of its design, construction and understanding of the special needs in animal wound care, significantly reduces the inadequacies and problems associated with the traditional techniques. The main problem in veterinary wound care is retention or maintenance of the wound dressing. The present invention reduces and/or eliminates the following:

1. Difficulty in finding a retention solution for the numerous anatomic locations in need of a wound dressing, such as, but not limited to the hip, torso, shoulder, head, ears and foot pad.
2. Frequent need to shave an animal so that adhesives can be utilized.
3. Complications from the use of adhesives due to pain on dressing removal, damage to the skin and need to remove hair or fur that at times requires a general anesthetic for the animal for the removal process.
4. Significant time required to perform wound dressing changes or applications.
5. Need for assistance of multiple individuals to perform dressing applications, change or removal.
6. Lack of a conforming dressing to various sized animals and anatomic locations.
7. Constrictive nature of traditional wound retention procedures, which are dangerous by restricting blood flow and airways.
8. Lack of reusability of the retention device.
9. Ability to perform only one function at a time, requiring the incorporation of a a second or third wound device for additional needs. The subject invention can perform more than one function at a time such as secure a wound dressing, hold a IV tube or drain tube and both in multiples.
10. Exclusion of the home setting as a treatment locale option because of the traditional method's complexity.
11. Movement of wound dressings with resultant reduction in efficacy.

In U.S. Pat. Nos. 5,456,660 and 5,662,599 to Shesol et al., a bidirectional disposable wound dressing and support unit is described for holding a variety of different size standard gauze pads on top of a wound and providing painless access to the wound without the use of adhesives. The disposable wound dressing and support unit is characterized by a window opening disposed along the length of the wrap. A gauze pad is releasably attached to the sides of the window opening. The window opening in the wrap allows for visual inspection of the gauze pad relative to the nature of wound drainage. This type of wound wrap, while effective in enhanced healing of a wound, is limited by the placement of the primary wound dressing next to the window opening. Also, U.S. Pat. No. 6,258,051 to Shesol et al. discloses the wound wrap having adhesive strips along the length thereof for securing a sterile gauze pad thereto and without the use of a window opening. But, this wound wrap is not contoured for holding a primary wound dressing for certain large or small unaccessible anatomic areas of an animal's body. Also, this type of wound wrap has a predetermined wound dressing site. The adhesive strips on the secondary wound dressing holder do not allow for placement of the primary wound dressing other than next to strips.

The above mentioned prior art wound wraps do not provide the unique features, structure and function of the subject invention as described herein when addressing the need for an animal wound wrap used in holding a primary wound dressing at various or multiple locations on the body of the animal.

SUMMARY OF THE INVENTION

In view of the foregoing and in response to the afore mentioned deficiencies and inadequacies of traditional veterinary retention devices and secondary wound dressings, the subject invention provides a solution to traditional problems along with the following objects and advantages.

1. Provide a means for retaining primary wound dressings, such as sterile gauze pads, cold/hot packs, drains, IV tubes, catheters and other medical devices.
2. Eliminate the need for using adhesives and constrictive wraps.
3. Conform anatomically to various animals at a variety of anatomic sites.
4. Providing for a rapid, painless access to a wound site on the animal.
5. Allow a pet owner or zoo keeper the ability and opportunity to take part in an animal's wound care. This feature has significant financial implications.
6. Perform a number of functions at the same time using a single animal wound wrap with one or more primary wound dressings.
7. Enhance wound healing by minimizing disruption at a wound site.
8. Minimize the need to have an area of fur shaved on the animal.
9. Reduce the number of individuals needed to apply or change a wound dressing.
10. Provide a washable, reusable wound dressing system.
11. Allow for dressing holder customization to specific medical and anatomic situations.
12. Provide a non-constrictive breathable, absorptive wound dressing environment.

13. Provide a wound wrap that can be stretched along two different axes, in opposite directions or bi-directionally, for positioning on various locations of the animal's body.

The subject invention broadly includes a secondary wound dressing holder in the form of an anatomic animal wound wrap. The animal wound wrap provides for painless access to a wound or incision on the body of an animal. Also, the animal wound wrap is readily adapted to various sizes and shapes of animals. The animal wound wrap includes in one embodiment an elongated abdomen wrap portion and an elongated extension wrap portion. The two wrap portions are made of stretchable loose weave material along its length. The abdomen wrap portion can be stretched along a first axis in opposite directions. Also, the extension wrap portion can be stretched along a second axis in opposite directions and at an angle to the first axis. The abdomen wrap portion includes a first end portion with first hook fasteners and a second end portion for releasably engaging the first hook fasteners. The abdomen portion is dimensioned for receipt around the abdomen of the animal. The extension wrap portion includes a first end portion attached to a side of the abdomen wrap portion and at an angle thereto. The extension wrap also includes a "U" shaped second end portion. The "U" shaped second end portion includes a first strap and a second strap. The straps are parallel to each other and include second hook fasteners. The straps are adapted for receipt around the animal's neck, tail, leg or other parts of the animal's body. The second hook fasteners are used for securing the straps thereon. The abdomen wrap portion and the extension wrap portion are adapted for receiving one or more primary wound dressings thereon and holding the dressing in place next to a wound on the animal. The animal wound wrap, in other embodiments, can be easily adapted for receipt around the animal's head, ears, hips, legs, paws and other parts of the anatomy for holding wound dressings and other medical devices next to a wound.

These and other objects of the present invention will become apparent to those familiar with various types secondary wound dressing holders and animal wound wraps when reviewing the following detailed description, showing novel construction, combination, and elements as herein described, and more particularly defined by the claims, it being understood that changes in the embodiments to the disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which:

FIG. 1 is a front and side perspective view of the subject animal wound wrap positioned for attachment to the abdomen and chest of a small dog. The dog is shown with a wound in the chest and the abdomen. Also in this drawing is a perspective view of the animal wound wrap shown without the animal.

FIG. 2 is a front view of the animal wound wrap with an abdomen wrap portion and an extension wrap portion having primary wound dressing attached thereto using hook fasteners attached either to the primary dressing or at the desired location of the wrap itself.

FIG. 3 is a side and rear perspective of the animal wound wrap attached to the abdomen and the neck of another small dog and a perspective view of the animal wound wrap removed from the dog.

DETAILED DESCRIPTION OF THE PREFERRED EMBODIMENTS

In FIG. 1, a front and side perspective view of the subject animal wound wrap is shown having general reference numeral 10. The animal wound wrap is illustrated and positioned for attachment to an abdomen 12 and a chest 14 of a small dog 16. The dog 16 is shown with a wound 18 in the chest 14 and the abdomen 12. A portion of the animal's fur is shown shaved next to the wounds 18. While the dog 16 is shown in the drawings, it can be appreciated that the wound wrap is easily adapted for used with various types of domestic animals and zoo animals.

The animal wound wrap 10 includes, in one embodiment, an elongated abdomen wrap portion 20 and an elongated extension wrap portion 22. The two wrap portions 20 and 22 are made of a stretchable loose weave material 24 along their length, as indicated by arrows 26 and 28. The stretchable loose weave material 24 allows the abdomen wrap portion 20 to be easily wrapped, tightened and loosed around the abdomen 12. Also, the stretchable loose weave material 24 allows the extension wrap portion 22 to be stretched next to the chest 14 and around a portion of a neck 30 of the dog 16.

A key feature of the animal wound wrap 10 is the ability of the abdomen wrap portion 20 to stretch, in opposite directions or bi-directionally, along a first axis or X—X axis. Also, the extension wrap portion 22 can be stretched, in opposite directions or bi-directionally, along a second axis or Y—Y axis. The Y—Y axis can be at a right angle to the X—X axis or any other angle thereto. In this manner, the extension wrap portion can be used to stretch and cover the chest 14 and other locations on the animal's body.

The abdomen wrap portion 20 includes a first end portion 32 with first hook fasteners 34 and a second end portion 36. The first hook fasteners 34 are used for securing the first end portion 32 to the second end portion 36. The abdomen wrap portion 20 is dimensioned for receipt around the abdomen 12 of the dog 16.

The extension wrap portion 22 includes a first end portion 38 attached to a side 40 of the abdomen wrap portion 20 with it's Y—Y axis at a right angle to the X—X axis. Obviously, the extension warp portion 22 can be attached to the abdomen wrap portion 20 at various angles to the X—X axis of the abdomen wrap portion 20. The extension wrap portion 22 also includes a "U" shaped second end portion 42. The "U" shaped second end portion 42 includes a first strap 44 and a second strap 46. The straps 44 and 46 are parallel to each other and include second hook fasteners 34 at the ends thereof. The straps 44 and 46, in this example, are adapted for receipt around the dog's neck 30. The hook fasteners 34 are used for securing the straps 44 and 46 to each other, as shown in this drawing and in FIG. 3.

In FIG. 2, a front view of the animal wound wrap 10 is shown with the abdomen wrap portion 20 and the extension wrap portion 22 having primary wound dressings 48, such as sterile gauze pads, attached thereto using hook fasteners 34. The hook fasteners 34 are readily adapted to engaging the "loop-like" loose weave material 24 used in making up the animal wound wrap 10. Obviously, by using the hook fasteners 34 and the loose weave material 24, the primary wound dressings 48 can be spotted at various locations on the wrap portions 20 and 22 for covering wounds 18 on the animal and holding the wound dressings in place.

Also shown in FIG. 2 is a tube-holding strip 49 having hook fasteners 34 at it's length. The tube holding strip 49 is used for holding an IV tube 50, a drain tube and the like next to the side of the animal and next to the wrap.

In FIG. 3, a side and rear perspective of the animal wound wrap 10 is shown attached to the abdomen 12 with the extension wrap portion 22 turned around to cover the back of the neck 30 of another small dog 16. The first and second straps 44 and 46 are shown received around the dog's neck 30 and secured to the extension wrap portion 22 using the hook fasteners 34. As mentioned above, the extension wrap portion 22 can be at various angles from the abdomen wrap portion 20 and can be extended caudally for covering the back of the animal, around the tail, around the rear leg of the animal or under the belly of the animal, with the straps 44 and 46 used for holding the extension wrap portion 22 thereon.

While the animal wound wrap 10 is shown for holding primary wound dressings 48 on the abdomen and the chest or neck of the dog 16, it can be appreciated that the wrap can easily be increased in size for covering the animal's shoulders, hips, around the tail and a portion of the front and rear legs. Also, the animal wound wrap 10 can be decreased in size for covering the animal's head, ears and paws and holding a wound dressing thereon.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

What is claimed is:

1. An animal wound wrap adapted for receipt around an abdomen and on another location on an animal's body, the wound wrap comprising:
   an abdomen wrap portion adapted for receipt around the animal's abdomen and having a first end portion with a first fastener means, said first fastener means for releasably engaging a second end portion of said abdomen wrap portion, said abdomen wrap portion made of a stretchable loop-like loose weave material; and
   an extension wrap portion having a first end portion attached to a side of said abdomen wrap portion and at an angle thereto, said extension wrap portion having a U-shaped second end portion having a first strap and a second strap, said first and second strap having a second fastener means thereon, said U-shaped second end portion adapted for receipt on another location of the animal's body, said second fastener means for releasably securing said U-shaped second end portion thereon, said extension wrap portion made of a stretchable loop-like loose weave material.

2. The wound wrap as described in claim 1, wherein said first and second fastener means releasably engage the stretchable loop-like loose weave material of said abdomen and extension wrap portions.

3. The wound wrap as described in claim 2 wherein said first and second fastener means are hook fasteners.

4. The wound wrap as described in claim 1 wherein said extension wrap portion is attached to the side of said abdomen wrap portion at right angles thereto.

5. The wound wrap as described in claim 1 further including at least one primary wound dressing having hook fasteners thereon for releasably engaging the loop-like loose weave material on said abdomen wrap portion and on said extension wrap portion.

6. The wound wrap as described in claim 1 further including a plurality of primary wound dressings having hook fasteners thereon for releasably engaging the loop-like loose weave material on said abdomen wrap portion and on said extension wrap portion.

7. The wound wrap as described in claim 1 further including a tube holding strap having hook fasteners thereon for releasably engaging the loop-like loose weave material on said abdomen wrap portion and on said extension wrap portion, said tube holding strap adapted for holding an IV tube or drain tube thereon.

8. An animal wound wrap adapted for receipt around an abdomen and on another location on an animal's body, the wound wrap comprising:
   an abdomen wrap portion made of stretchable loop-like loose weave material adapted for receipt around the animal's abdomen and having a first end portion with first hook fasteners thereon, said first hook fasteners for releasably engaging the loop-like loose weave material of a second end portion of said abdomen wrap portion; and
   an extension wrap portion made of stretchable loop-like loose weave material having a first end portion attached to a side of said abdomen wrap portion and at an angle thereto, said extension wrap portion having a U-shaped second end portion, said U-shaped second end portion having a first strap and a second strap, said first and second strap having said second hook fasteners thereon, said second end portion adapted for receipt on another location of the animal's body, said second hook fasteners for releasably engaging the loop-like loose weave material on said U-shaped second end portion.

9. The wound wrap as described in claim 8 wherein said extension wrap portion is attached to the side of said abdomen wrap portion at right angles thereto.

10. The wound wrap as described in claim 8 further including at least one primary wound dressing having hook fasteners thereon for releasably engaging the loop-like loose weave material on said abdomen wrap portion and on said extension wrap portion.

11. The wound wrap as described in claim 8 further including a plurality of primary wound dressings having hook fasteners thereon for releasably engaging the loop-like loose weave material on said abdomen wrap portion and on said extension wrap portion.

12. The wound wrap as described in claim 8 further including a tube holding strap having hook fasteners thereon for releasably engaging the loop-like loose weave material on said abdomen wrap portion and on said extension wrap portion, said tube holding strap adapted for holding an TV tube or drain tube thereon.

13. An animal wound wrap adapted for receipt around an abdomen and on another location on an animal's body, the wound wrap comprising:
   an abdomen wrap portion made of stretchable loop-like loose weave material adapted for receipt around the animal's abdomen and having a first end portion with first hook fasteners thereon, said first hook fasteners for releasably engaging the loop-like loose weave material of a second end portion of said abdomen wrap portion, said abdomen wrap portion stretchable in opposite directions along a first axis, said first axis disposed along a length of said abdomen wrap portion;

an extension wrap portion made of stretchable loop-like loose weave material having a first end portion attached to a side of said abdomen wrap portion and at an angle thereto, said extension wrap portion having a U-shaped second end portion with second hook fasteners, said U-shaped second end portion adapted for receipt on another location of the animal's body, said second hook fasteners for releasably engaging the loop-like loose weave material on said second end portion, said extension wrap portion stretchable in opposite directions along a second axis, said second axis disposed along a length of said extension wrap portion.

14. The wound wrap as described in claim 13 wherein said second axis of said extension wrap portion is disposed at a right angle to said first axis of said abdomen wrap portion.

15. The wound wrap as described in claim 13 further including at least one primary wound dressing having hook fasteners thereon for releasably engaging the loop-like loose weave material on said abdomen wrap portion and on said extension wrap portion.

16. The wound wrap as described in claim 13 further including a plurality of primary wound dressings having hook fasteners thereon for releasably engaging the loop-like loose weave material on said abdomen wrap portion and on said extension wrap portion.

17. The wound wrap as described in claim 13 further including a tube holding strap having hook fasteners thereon for releasably engaging the loop-like loose weave material on said abdomen wrap portion and on said extension wrap portion, said tube holding strap adapted for holding an IV tube or drain tube thereon.

* * * * *